United States Patent [19]

Butter et al.

[11] 4,148,121
[45] Apr. 10, 1979

[54] METHOD AND APPARATUS FOR MANUFACTURING ROTATIONALLY SYMMETRICAL CONSTRUCTIONAL PARTS SUCH AS NOZZLES AND COMBINATION CHAMBERS OF ROCKET ENGINES

[75] Inventors: Karl Butter, Ottobrunn; Manfred Lechner, Munich; Kurt Stich, Unterhaching, all of Fed. Rep. of Germany

[73] Assignee: Messerschmitt-Bölkow-Blohm Gesellschaft mit beschränkter Haftung, Fed. Rep. of Germany

[21] Appl. No.: 872,432

[22] Filed: Jan. 26, 1978

Related U.S. Application Data

[63] Continuation-in-part of Ser. No. 717,693, Aug. 25, 1976, abandoned, which is a continuation of Ser. No. 580,141, May 23, 1975, abandoned.

[30] Foreign Application Priority Data

Jun. 12, 1974 [DE] Fed. Rep. of Germany ....... 2428277

[51] Int. Cl.$^2$ ............................................. B23P 15/26
[52] U.S. Cl. ............................. 29/157 C; 29/157.3 R; 228/173 F; 228/183; 228/44.1 R; 72/143; 72/371
[58] Field of Search ............ 29/157 C, 157.3 R, 33 T, 29/33 K, 173, 727, 726; 72/142, 143, 371; 228/173 F, 178, 44.1, 183

[56] References Cited

U.S. PATENT DOCUMENTS

| | | | |
|---|---|---|---|
| 1,802,161 | 4/1931 | Summers | 29/727 |
| 2,094,204 | 9/1937 | Carter et al. | 72/142 |
| 2,758,629 | 8/1956 | Lewis | 29/173 |
| 2,880,577 | 4/1959 | Halford et al. | 29/157 C |
| 2,976,679 | 3/1961 | Dalgleish | 29/157 C |
| 3,156,040 | 11/1964 | Drexhage | 29/157 C |
| 3,162,012 | 12/1964 | Blaze et al. | 29/157 C |
| 3,285,518 | 11/1966 | Reid et al. | 29/157 C |
| 3,349,464 | 10/1967 | Becker, Jr. et al. | 29/157 C |

Primary Examiner—C. W. Lanham
Assistant Examiner—Daniel C. Crane
Attorney, Agent, or Firm—McGlew and Tuttle

[57] ABSTRACT

The constructional parts have walls formed of elongated elements, such as wires or tubes, wound spirally in juxtaposition about the axis of symmetry of the part and connected to each other. The elongated elements are bent to shape utilizing a bending device having at least one bending groove conformable to the predetermined three-dimensional geometry of the part to be manufactured. One end of each wire or tube is fixed to the bending device and the other end is engaged in a clamping and adjusting device designed as a combined Cardan swivel joint which, during the bending, it utilized to continuously control the adjustment parameters of the wire or tube, about three mutually intersecting axes, in conformity with such predetermined three-dimensional geometry of the part. The bent elements are then assembled in juxtaposition on an assembly core, separate from the bending device, having an external contour identical with the internal contour of the finished part, and the opposite ends of assembled juxtaposed elements are clamped against movements. The juxtaposed elements are then wrapped with a wire winding extending completely over the juxtaposed elements. The wire winding is then removed, by sectors or zones or areas, and the thus-exposed juxtaposed elements are then secured to each other, in the exposed zones, as by welded seams, to form the finished constructional part when the wire wrapping has been completely removed and all of the juxtaposed elements have been secured to each other.

16 Claims, 14 Drawing Figures

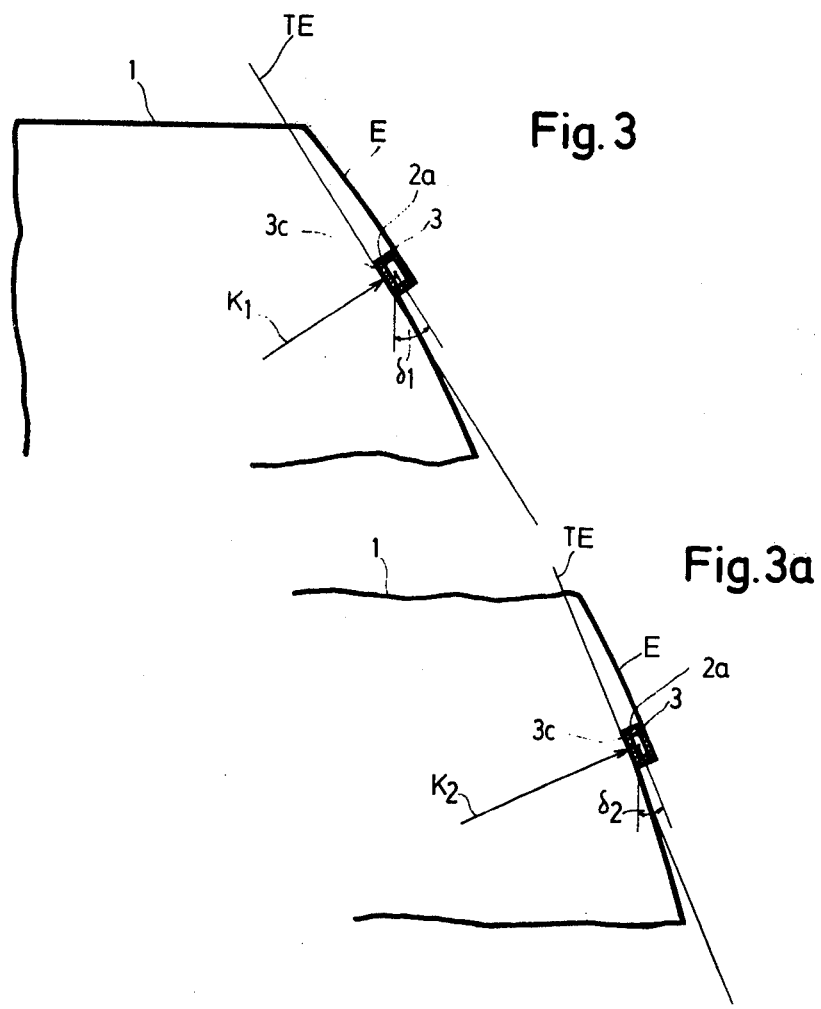

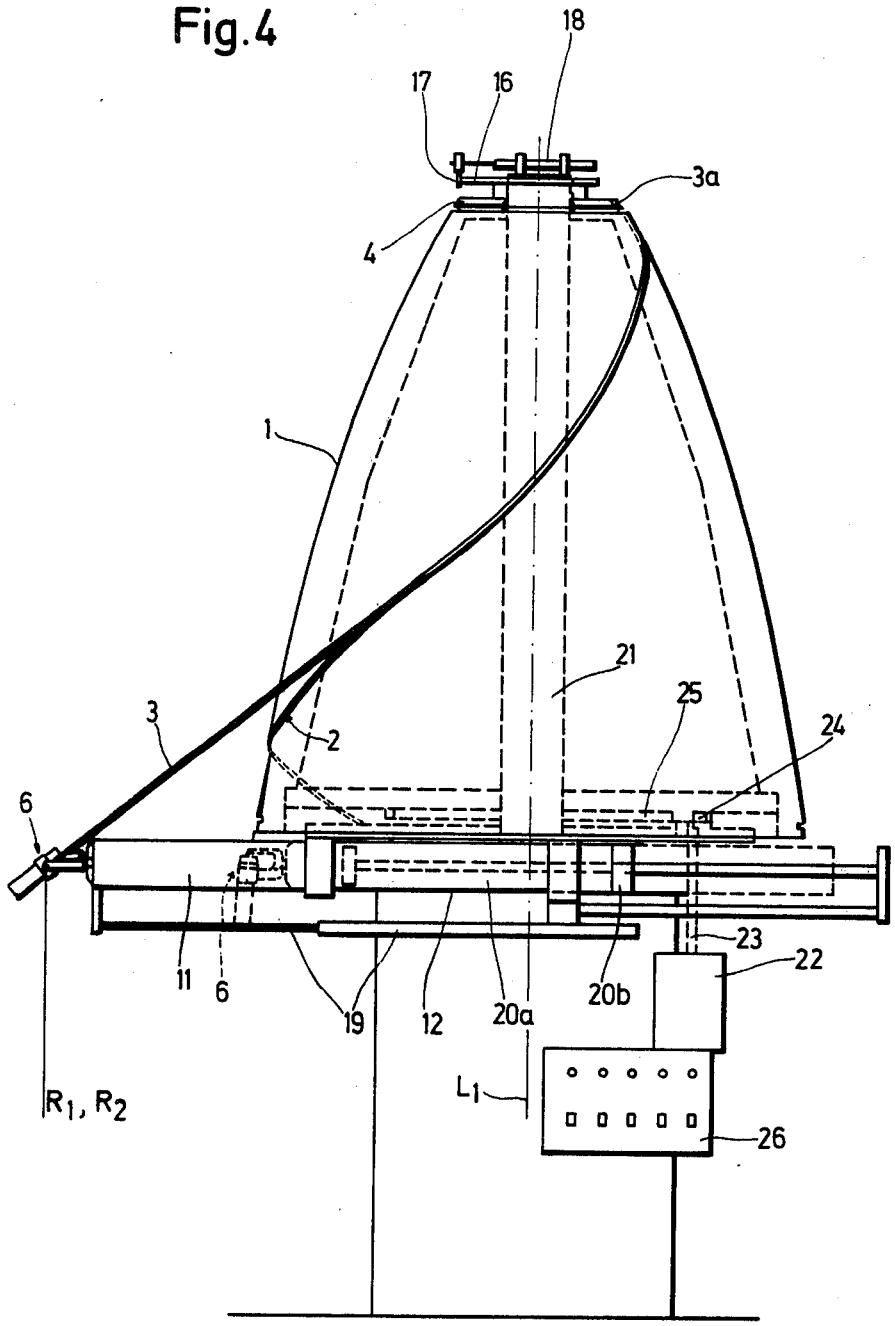

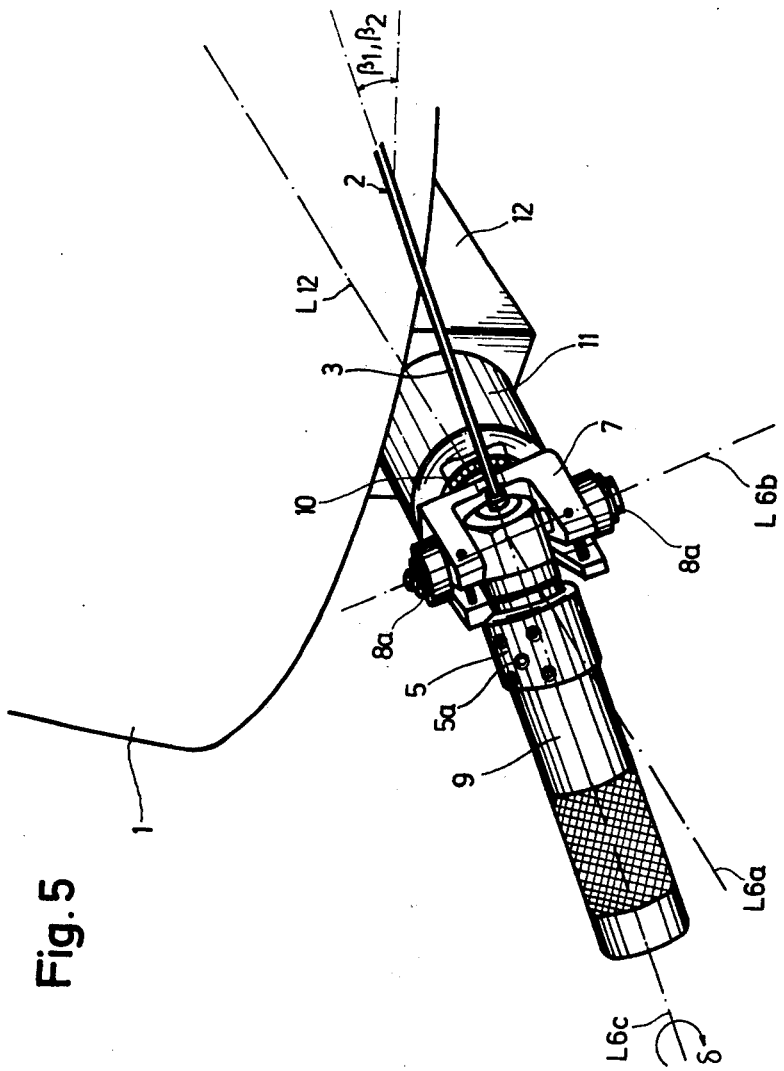

METHOD AND APPARATUS FOR MANUFACTURING ROTATIONALLY SYMMETRICAL CONSTRUCTIONAL PARTS SUCH AS NOZZLES AND COMBINATION CHAMBERS OF ROCKET ENGINES

CROSS-REFERENCE TO RELATED APPLICATION

This application is a Continuation-in-Part of application Ser. No. 717,693, filed Aug. 25, 1976, now abandoned and which, in turn, is a streamlined continuation of application Ser. No. 580,141, filed May 23, 1975, and now abandoned.

FIELD AND BACKGROUND OF THE INVENTION

The present invention relates to a method of manufacturing rotationally symmetrical, particularly liquid-cooled, constructional parts, such as nozzles and combustion chambers of rocket engines, having their walls formed of wires or tubes abutting in juxtaposition and connected to each other, and spirally wound about the axis of symmetry of the constructional part.

In rocket construction, it is well-known to assemble liquid-cooled combustion chambers and thrust nozzles of tubes which are juxtaposed in the circumferential direction and firmly connected to each other. In such cases, because of the cross-sectional variation of the thrust nozzles and sometimes also the combustion chambers, the tube extent in the longitudinal direction must either be made with a cross-section varying in accordance with the respective variation of the diameter or, with a uniform cross-section of the tubes, the formed interspaces must be bridged by webs or filling material. In high pressure combustion chambers, for reasons of resistance, either pressure resistant external jackets or bandages are necessary. However, a multi-layer wall structure of different materials may cause undesirable thermal stresses. On the other hand, the manufacture of tubes with necessarily largely varying cross-sections is complicated and expensive.

British Pat. No. 794,660 discloses a combustion chamber with a thrust nozzle having its walls enitely made of tubes which are juxtaposed in the circumferential direction and extend in spirals from one end of the constructional part to the other, with the pitch of each spiral depending on the respective diameter, i.e., being flatter for a larger diameter and steeper for a smaller diameter. The combustion chamber, as a constructional unit, is manufactured so that the individual tubes are bent to the necessary spiral shapes, juxtaposed individually or by twos and united by welding or another fastening method. Nothing is disclosed in this British patent, however, about the practical carrying out of the proposed method and the individual operational steps of their sequence.

SUMMARY OF THE INVENTION

The present invention is directed to a method of manufacturing constructional parts of the mentioned kind, such as rocket combustion chambers and thrust nozzles, having their walls made of abutting juxtaposed tubes extending in the circumferential direction and wound spirally, as well as to devices for carrying out the method.

To this end, in accordance with the invention, the following operational steps and devices are provided:

(a) Bending to shape of the tubes individually by means of a bending device comprising at least one bending groove including a bending edge and corresponding to the given or predetermined three-dimensional geometry of the constructional part to be manufactured;

(b) a clamping and adjusting device associated with the bending device, and intended for the rear end of the tube which has its front end fixed to the bending device, this device being adapted to continuously control the adjustment parameters of the tube during the bending operation in the bending groove or along the bending edge in conformity with the given three-dimensional geometry of the constructional part to be manufactured; and (c) a separate assembly fixture, particularly an assembly core, having its external contour equal to the internal contour of the finished constructional part and comprising holding means for the front and rear ends of the tubes, for bunching and connecting the tubes.

In accordance with the invention, the clamping and adjusting device is designed as a combined Cardan swivel joint, comprising a clamping lock for the rear end of the tube, and mounted on a tool slide which is displaceable in a straight guideway extending, at the bottom or rear end of the bending device, perpendicularly to the central longitudinal axis of the same.

The tube bending operation in accordance with the invention comprises adjusting the position of the tube at its instantaneous peel-off point at the bending edge or bottom of the bending groove by turning the Cardan swivel joint, about a first axis, coinciding with the longitudinal axis of the straight guideway for the tool slide, through a respective angle of inclination so as to adjust the inclination of the tube to the inclination of the edge or groove, about a second axis, through a respective swiveling angle so as to align the tube with the tangent to the respective radius of curvature at the peel-off point, and about a third or swivel axis, through an angle of rotation so as to turn the tube about its longitudinal axis to tangency with the generatrix of the inner surface of the finished constructional part, and simultaneously, for example by turning the bending device, bringing the Cardan swivel joint into consecutive positions which depend on the progressive bending of the tube along the bending edge or bottom of the bending groove and which are given by the respective point of intersection of the longitudinal axis of the straight guideway for the tool slide and the respective pitch tangent extending perpendicularly to the respective radius of curvature at the peel-off point.

While using high-temperature resistant steels with high proportions of alloying constituents, such as nickel and molybdenum, a certain internal strain remains in the tubes after bending, with the result that the shapes of the individual tubes are not exactly identical. For this reason, in accordance with the invention, prior to uniting them, for example by welding, such tubes are clamped together circumferentially and fixed in this position on the separate assembly fixture, for example, by a wire envelopment of wrapping wound perpendicularly to the longitudinal axis of the constructional part. Therupon, the individual tubes are connected in sectors or zones in which a corresponding portion of the wire winding has been wound off again or otherwise removed.

As compared to the known methods of manufacturing combustion chambers and thrust nozzles, the method in accordance with the invention ensures, with an at least equal mechanical resistance, a smaller constructional weight of the manufactured parts. The manufacturing costs are also relatively lower since the inventive method makes it possible to use tubes with a uniform cross-section throughout also for constructional parts having a varying diameter in the longitudinal direction. Such tubes with a uniform cross-section are substantially less expensive and time saving in manufacture because, with a once designed and equipped machine and trained workers, relatively short manufacturing times can be obtained. The wall structure of the finished constructional part remains largely determined by the fundamental properties of the finished starting material, i.e., the tube and its material, and by the quality of the assemblage. However, these are quality factors simple to overlook so that the invention ensures a greater security and longer life in service.

An object of the invention is to provide an improved method of manufacturing rotationally symmetrical constructional parts, such as nozzles and combustion chambers of rocket engines, having their walls formed of wires or tubes abutting in juxtaposition and connected to each other, and spirally wound about the axis of symmetry.

Another object of the invention is to provide improved devices for performing the method.

A further object of the invention is to provide such a method and devices with which manufacturing costs are relatively lower by virtue of using tubes with a uniform cross-section throughout for manufacturing constructional parts having a varying diameter in the longitudinal direction.

For an understanding of the principles of the invention, reference is made to the following description of a typical embodiment thereof as illustrated in the accompanying drawings.

BRIEF DESCRIPTION OF THE DRAWINGS

In the Drawings:

FIGS. 2 and 2a are top plan views corresponding, respectively, to FIGS. 1 and 1a;

FIGS. 3 and 3a are side elevation views, partly in section, illustrating positions of the tube, during the bending operation, relative to the generatrix or envelope curve;

FIG. 4 is a side elevation view of the bending machine;

FIG. 5 is a perspective view of the Cardan swivel joint;

DESCRIPTION OF THE PREFERRED EMBODIMENT

Figure 6:
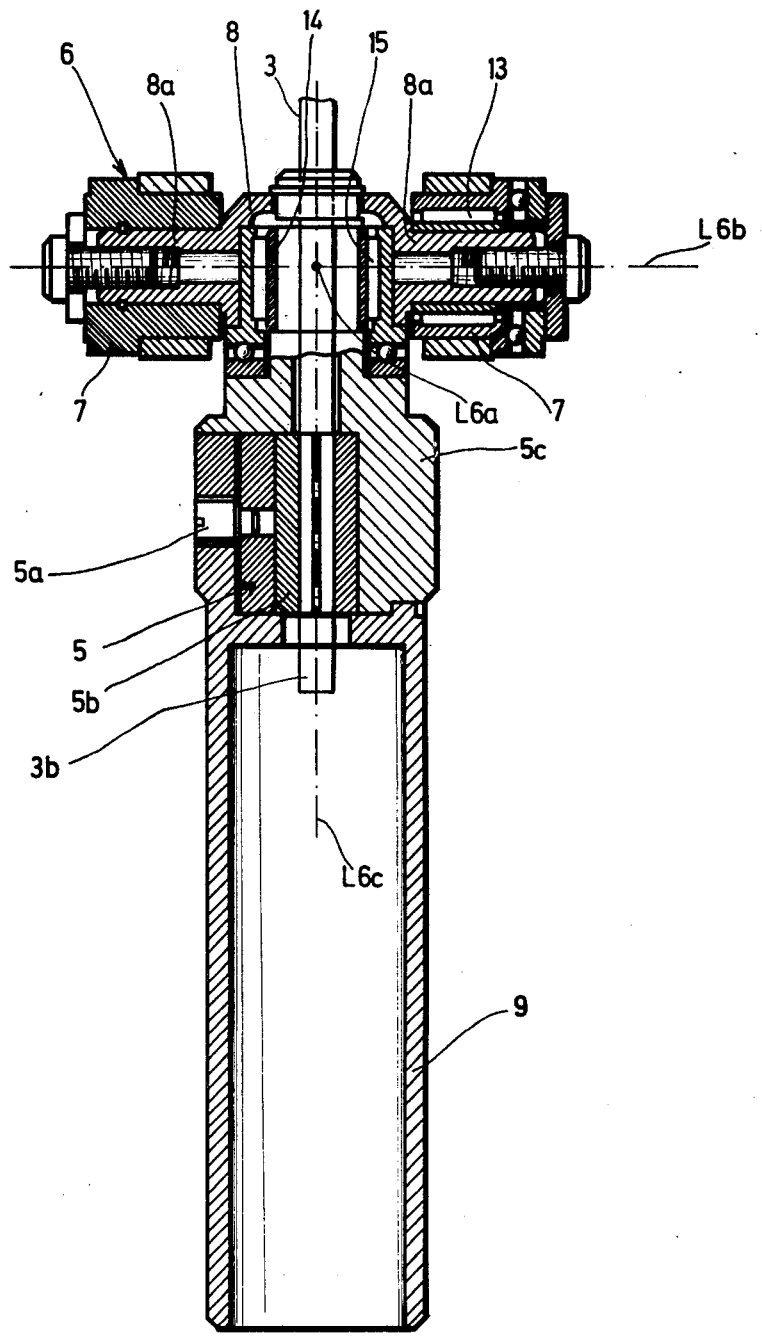
FIG. 6 is a longitudinal sectional view through the Cardan swivel joint.

Referring first to FIGS. 1 through 4, the bending device 1 comprises a parabolic body provided with a bending guide, such as a milled bending groove 2 including a bending edge 2a conforming with the given three-dimensional geometry of the constructional part to be manufactured. Bending groove 2 serves to form single tubes 3, each having its front end 3a fixed to a stationary holding member 4 (FIG. 4). The rear end 3b (FIG. 6) of tube 3 is retained by means of a clamping lock 5 comprising a tightening screw 5a and split clamping jaws 5b.

Clamping lock 5 forms a part of a combined Cardan swivel joint 6. This joint comprises four main parts, namely, a fork part 7, a hinge part 8 with hinge pins 8a, the clamping lock 5, and a handle 9. Fork part 7 of the Cardan joint is pivotally mounted, through a ball bearing 10 and for pivoting about a first Cardan axis L6a, on a tool slide 11 which is slidably movable in a straight guideway 12. The longitudinal axis L12 of guideway 12, coinciding with the first Cardan axis L6a, extends perpendicularly to the central longitudinal axis L1 of bending device 1 and intersects the same. Hinge part 8 of the Cardan joint is pivotally mounted, through needle bearings 13, in fork part 7 of Cardan swivel joint 6. The respective pivot axis forms the second Cardan axis L6b which extends perpendicularly to the first axis L6a. *Handle 9 comprises a casing 5c* of clamping lock 5 and terminates, at the side of the joint, with a pivot 14 which is adapted to swivel, through a central needle bearing 15, in hinge part 8 about a third or swivel axis L6c.

The combined Cardan swivel joint 6 along with straight guideway 12 for tool slide 11 makes it possible to adjust tube 3 in alignment with the bending curve at each point of the same as to the pitch and tangency, with respect to the following four parameters:

(1) By turning the joint about the first Cardan axis L6a, the respective pitch $\beta_1$, $\beta_2$ of the tube 3 to be bent can be adjusted relative to its instantaneous peel-off point on bending edge 2a of bending groove 2.

Figure 1:
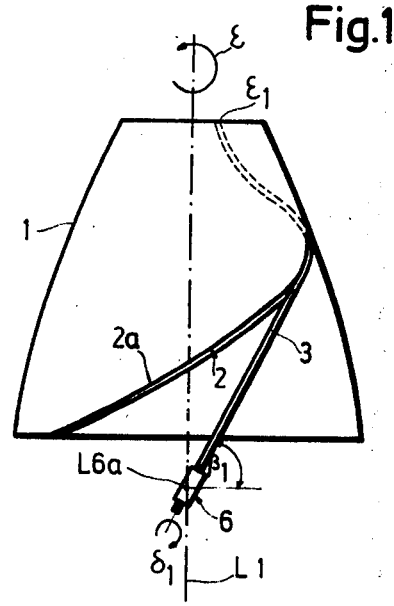
FIGS. 1 and 1a are side elevation views illustrating the bending operation with a single tube.
Figure 2:
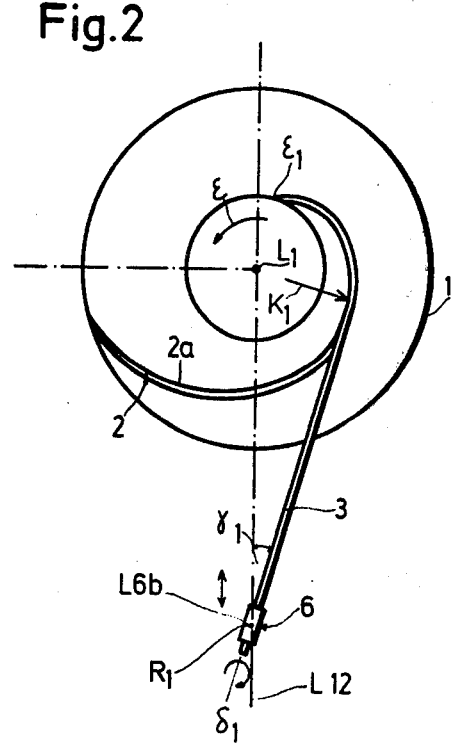
Figure 1A:
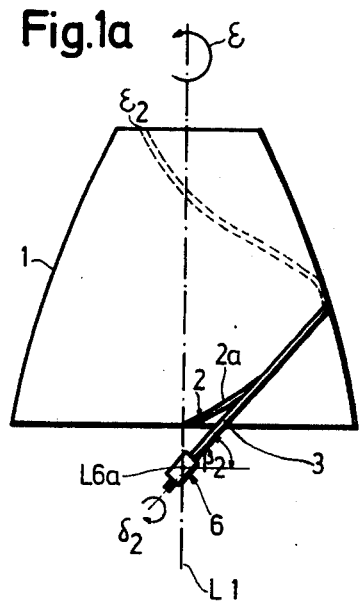
Figure 2A:
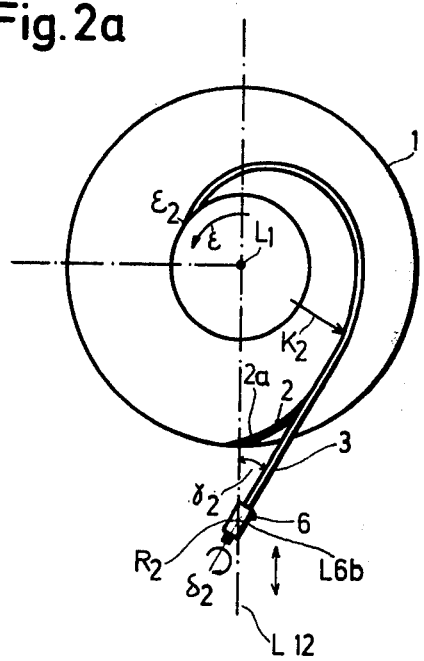

(2) By turning the joint about its second Cardan axis L6b through a respective angle $\gamma_1$, $\gamma_2$, as shown in FIGS. 2 and 2a, tube 3 can be adjusted tangentially, i.e., at a right angle to the respective radius of curvature $K_1$, $K_2$ of the bending curve at the instantaneous peel-off point.

(3) The respective tangential adjustment of tube 3 having a rectangular cross-section relative to the generatrix E is effected by the swivel joint, i.e., by turning handle 9 along with the clamping lock about swivel axis L6c through the respective swivel angle $\delta_1$, $\delta_2$. This adjustment of the position of tube 3 relative to the tangent TE of generatrix E is shown in FIGS. 3 and 3a. In this case, the radially inner surface 3c of tube 3 is positioned so as to be perpendicular to the respective radius of curvature $K_1$, $K_2$.

(4) During the bending of tube 3, bending device 1 executes a rotary motion $\epsilon$ corresponding in angular distance to the spiral angle of the finish bent tube. Each point $\epsilon_1$, $\epsilon_2$, of this rotary motion is associated with a point $R_1, R_2$ on the longitudinal axis of straight guideway 12 of tool slide 11. This association is controlled as a function of rotary motion $\epsilon$ or of the angle of rotation through a positive control (FIG. 4) substantially comprising a cam 16 firmly fixed to the top of bending device 1, a tracer point 17 acting on an electric control-value transmitter 18, an electric control-value receiver 19 associated with guideway 12 of tool slide 11, and a servo cylinder 20a including a servo piston 20b actuating the tool slide 11.

Consequently, due to the adjustment of points $R_1$, $R_2$ on the axis of guideway 12 of tool slide 11 depending on the instantaneous angle of rotation $\epsilon_1$, $\epsilon_2$ of bending device 1 and in connection with the corresponding angles $\gamma_1$, $\gamma_2$, tube 3 is positioned in bending groove 2, at each instantaneous peel-off point, tangentially, so that tube 3 permanently extends in the pitch tangent, i.e., perpendicularly to the respective radius of curvature $K_1$, $K_2$ and at the respective pitch angle $\beta_1$, $\beta_2$. Cam 16 is shaped so that, depending on the respective angle of rotation $\epsilon_1$, $\epsilon_2$ of bending device 1, tool slide 11 is controlled along its path point by point so that Cardan swivel joint 6 is always positioned at the point of intersection of the pitch tangent extending at a right angle to the respective radius of curvature $K_1$, $K_2$ and the axis of guideway 12.

Bending device 1 is rotatable about a stationary supporting column 21 and is driven by an electromotor 22 through a shaft 23, a drive pinion 24 and an internal gear 25 meshing therewith and fixed on bending device 1. The entire bending machine is controlled from a control desk 26.

Figures 7, 8:
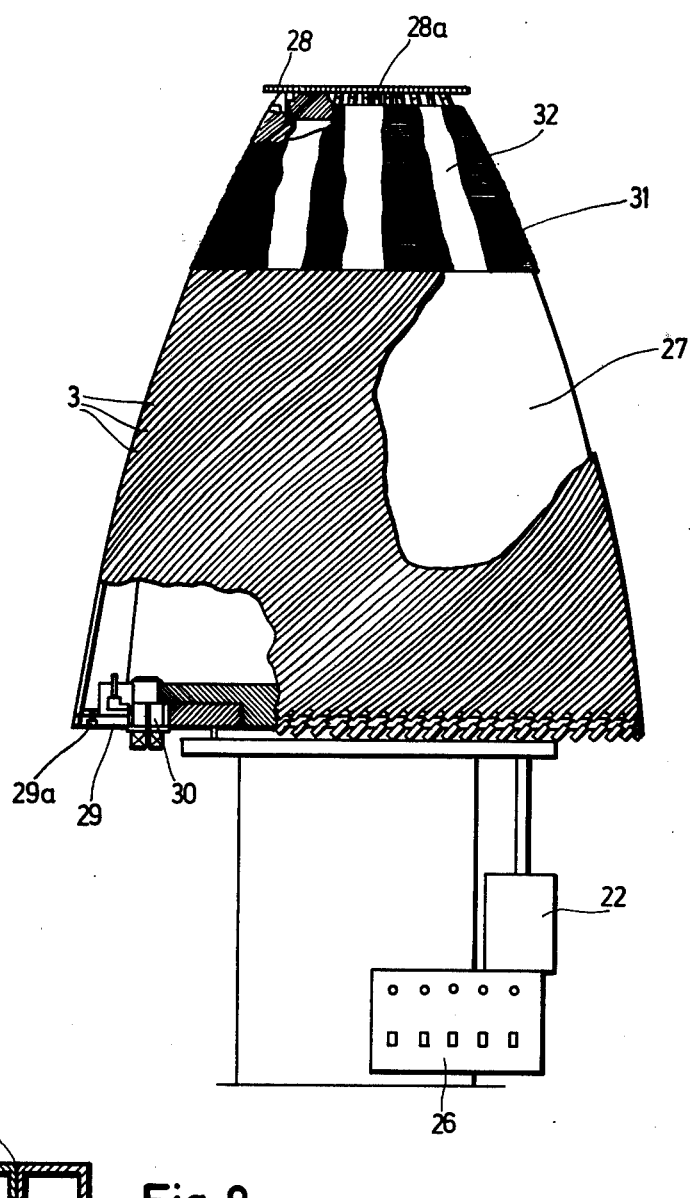
FIG. 7 is a side elevational view, partly broken away and partly in section,, of the assembly device for bunching of the tubes.
FIG. 8 is a sectional view illustrating three individual tubes welded to each other.
Figure 9:
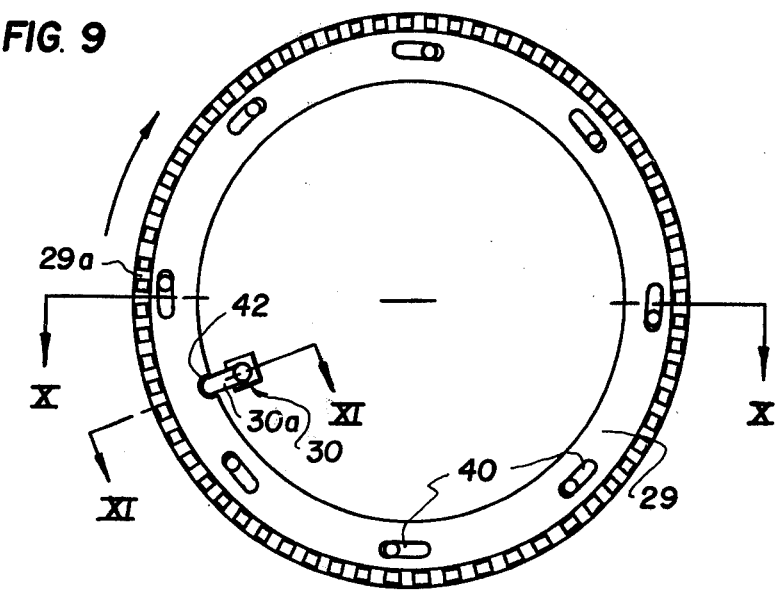
FIG. 9 is a plan view of a lower clamping disc forming part of the assembly device for bunching of the tubes.
Figure 10:
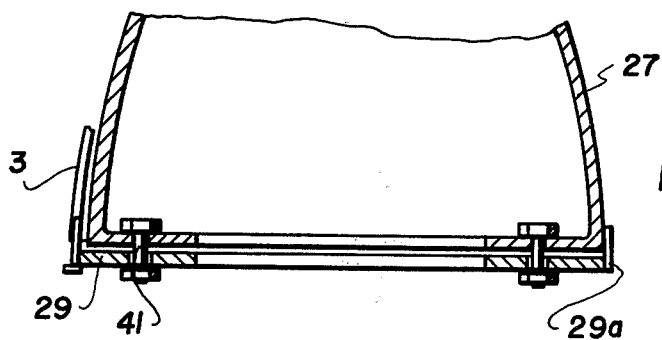
FIG. 10 is a section taken on the line X—X of FIG. 9.
Figure 11:
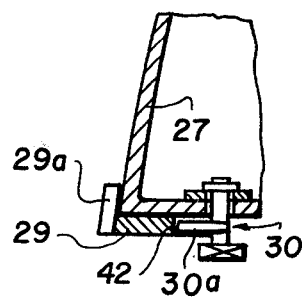
FIG. 11 is a sectional view taken on the line XI—XI of FIG. 9.

FIG. 7 shows the assembly fixture in the form of an assembly core 27 which is a distinct structure, separate from the bending device 1, and has an outer contour corresponding to the inner surface of the finished constructional part, and on which tubes 3 are mounted after having been bent on bending device 1. An upper fixing disc 28 provided with slots 28a for suspending the finish-bent tubes 3 therefrom is secured to the top of assembly core 27. The number of slots 28a may correspond to the number of the tubes 3. However, a number of slots 28a equal to only half the number of tubes may be provided and every other tube 3 may be inserted between two tubes 3 suspended from slots 28a. At the bottom of assembly core 27, a lower fixing disc 29 with slots 29a, where the lower ends of the tubes are hooked in, or gripped, for example by means of head screws 34 connected to the tubes, is provided and is angularly displaceable relative to assembly core 27. By means of an eccentric 30, lower fixing disc 29 can be angularly displaced, or tightened in a circumferential direction, and firmly secured in the tightened position on the assembly core 27, whereby the individual tubes 3 are clamped in juxtaposition to each other. This is important in cases where tubes 3 are made of an "elastically recovering" material. In the clamped state of the tubes, a wire winding 31 is fitted on the bunched tubes 3 and wound perpendicularly to the longitudinal axis of assembly core 27. To fix the envelopment, the wire winding may be soldered in limited zones or solder fields 32.

The individual tubes 3, in bunched and clamped state, as shown in FIGS. 7 and 8, are connected to each other by welding of the outer adjacent edges. The welding operation is effected gradually, by sectors, from fixing disc 29, after a corresponding portion of wire winding 31 has been previously removed to expose the tube portions to be welded together. The welding seams extending in the direction of the spirals are designated 33.

More specifically, in securing the bent tubes to each other while they are mounted in conforming relation on core 27, several turns of wire winding 31 are first removed, beginning adjacent disc 29, thus exposing the bent tubes which are then welded to each other in the exposed zone. Following this, winding 31 is further unwound to expose another portion of the bent tubes which then are welded to each other. This is continued until the winding 31 has been completely removed, step-by-step or sector-by-sector, while the bent tubes have been welded to each other in each thus exposed area, zone, or sector.

In the present example, the invention is described as applied to tubes 3 having rectangular or square cross-sections. In an equally advantageous manner, however, the invention may be applied to tubes of any other cross-section.

While a specific embodiment of the invention has been shown and described in detail to illustrate the application of the principles of the invention, it will be understood that the invention may be embodied otherwise without departing from such principles.

We claim:

1. A method of manufacturing rotationally symmetrical construction parts, such as nozzles and combustion chambers of rocket engines, having walls formed of elongated elements, such as wires or tubes, wound spirally about the axis of symmetry of the constructional part and connected to each other, said method comprising the steps of clamping one end of each element; bending each element to shape by bending it into contact with at least one bending guide which conforms to the predetermined three-dimensional geometry of the constructional part to be manufactured; during such bending, continuously controlling the adjustment parameters of the element, about three mutually intersecting axes in conformity with such predetermined three-dimensional geometry of the constructional part to be manufactured; removing each bent element from the bending guide; assembling the bent elements in juxtaposition on an assembly core having an external contour identical with the internal contour of the finished constructional part; clamping the opposite ends of the thus assembled juxtaposed elements against movement; restraining the bent elements in conforming engagement with the assembled core; progressively securing the juxtaposed elements to each other, in correspondence with progressive release of the restraint, to form the finished constructional part; and removing the finished constructional part from the assembly core.

2. A method as claimed in claim 1, in which said elongated elements are rectangular cross-section tubes; during the bending operation, adjusting the respective angle of inclination of the tube, at its instantaneous peel-off point at the bending guide, about a first axis extending perpendicular to and intersecting the axis of symmetry of the constructional part and located in a plane perpendicular to such axis of symmetry; during the bending operation, further adjusting the swing angle, defined between the longitudinal center line of the tube and such first axis, at the instantaneous peel-off point of the tube at the bending guide, perpendicular to the respective radius of curvature of the bending guide, about a second axis perpendicular to and intersecting such first axis; during the bending operation, further adjusting the tube through an angle of rotation about its longitudinal center line to tangency with the generatrix of the inner surface of the finished constructional part; the foregoing adjustments being effected by clamping the opposite end of the rectangular tube at a clamping point; and, during relative rotation of the bending guide and the rectangular cross-section tube, simultaneously adjusting such clamping point longitudinally of such first axis between points of intersection of such first axis with the respective pitch tangent extending perpendicular to the respective radius of curvature of the bending guide.

3. A method as claimed in claim 1, in which the elongated elements are rectangular cross-section tubes; and securing the juxtaposed bent tubes, extending circumferentially of the finished constructional part, to each other by welding.

4. A method as claimed in claim 3, in which the individual tubes are welded to each other only along their radially outer adjacent edges extending along the bending curve.

5. A method as claimed in claim 3, in which, after the bent tubes have been assembled in juxtaposition on the assembly core and their opposite ends have been clamped against movement, winding a wire about the assembled bent tubes with the planes of the winding extending perpendicularly to the longitudinal axis of the assembly core; and, during welding of the tubes to each other, winding off the wire by sectors.

6. A method as claimed in claim 5, in which the turns of said wire winding are soldered together by sectors in the form of individual solder fields.

7. Apparatus for manufacturing rotationally symmetrical constructional parts, such as nozzles and combustion chambers of rocket engines, having walls formed of elongated elements, such as wires or tubes, wound spirally about the axis of symmetry of the constructional part and connected to each other, said apparatus comprising, in combination, a bending device having at least one bending guide which conforms to the predetermined three-dimensional geometry of the constructional part to be manufactured; holding means operable to clamp one end of each element to said bending device for bending of the element to shape by bending it into contact with said bending guide; a clamping and adjusting device operatively associated with said bending device and operable to clamp the other end of each element to continuously control the adjustment parameters of the element, during bending of the element, about three mutually intersecting axes in conformity which such predetermined three-dimensional geometry of the constructional part to be manufactured; an assembly core having an external contour identical with the internal contour of the finished constructional part, arranged to have the bent elements assembled in juxtaposition thereon; and clamping means operatively associated with said assembly core and operable to clamp the opposite ends of the assembled juxtaposed elements against movement.

8. Apparatus as claimed in claim 7, in which said clamping means comprises fixing discs at opposite ends of said assembly core having slots therein arranged to receive the ends of the elements for bunching and connection of the element to each other.

9. Apparatus as claimed in claim 7, in which said clamping and adjusting device comprises a combined Cardan swivel joint including a clamping lock for the opposite end of each element to be bent.

10. Apparatus as claimed in claim 9, including a rectilinear guideway at the bottom end of said bending device extending perpendicular to the axis of rotation thereof; and a tool slide engageable in said rectilinear guideway for longitudinal displacement therealong, said combined Cardan swivel joint being mounted on said tool slide.

11. Apparatus as claimed in claim 10, in which said combined Cardan swivel joint has first, second and third mutually intersecting axes; said elongated elements being rectangular cross-section tubes; the respective angle of inclination of each tube at its instantaneous peel-off point at said bending guide being adjusted, during the bending operation, about said first Cardan axis which coincides with the center line of said rectilinear guideway; the respective swing angle between each tube and said first Cardan axis, at its instantaneous peel-off point at said bending guide being adjusted about said second Cardan axis, which is perpendicular to and intersects said first Cardan axis, perpendicularly to the respective radius of curvature of said bending guide; the angle of rotation of each tube about its longitudinal center line being adjusted about said third Cardan axis into tangency with the generatrix of the inner surface of the finished constructional part; and means operable, responsive to relative rotation of said bending device and the tube, and depending on the progressive winding of the tube along said bending guide, to simultaneously position said combined Cardan swivel joint along the length of said rectilinear guideway so that, in each case, said Cardan swivel joint is at the point of intersection of said rectilinear guideway with the respective pitch tangent extending perpendicular to the respective radius of curvature of said bending guide.

12. Apparatus as claimed in claim 9, in which said Cardan swivel joint includes a handle by means of which said Cardan swivel joint is manually operated by turning it about said first, second and third Cardan axes, with said third Cardan axis being coincident with the longitudinal center line of said handle.

13. Apparatus as claimed in claim 12, in which, during the bending operation, said bending device remains stationary while said rectilinear guideway pivots about the longitudinal axis of said bending device.

14. Apparatus as claimed in claim 12, including automatically operating actuating mechanism operable to positively determine the respective position of said tool slide along said rectilinear guide as a function of the angle of relative rotation of said bending device and said tool slide.

15. Apparatus as claimed in claim 14, including a support column for said bending device; said automatically operating actuating mechanism including a control cam fixedly secured to said supporting column, a tracer point operatively associated with said bending device and rolling on said control arm, an electric control-value transmitter actuated by said tracer point; an electrohydraulic control-value receiver operatively connected to said transmitter, a servo cylinder operatively connected to said receiver and controlled thereby, and a servo piston slidable in said servo cylinder and operatively connected to said tool slide of said Cardan swivel joint.

16. Apparatus as claimed in claim 14, including an eccentric acting on said assembly core to turn the same in a direction to clamp the tubes on said assembly core.

* * * * *